(12) United States Patent
Trollope et al.

(10) Patent No.: US 10,997,235 B2
(45) Date of Patent: *May 4, 2021

(54) METHODS, SYSTEMS, AND MEDIA FOR GENERATING SEARCH RESULTS BASED ON CONTEXTUAL INFORMATION

(71) Applicant: Google LLC, Mountain View, CA (US)

(72) Inventors: Ingrid McAulay Trollope, Richmond (GB); Ant Oztaskent, Sutton (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,053

(22) Filed: Jun. 18, 2018

(65) Prior Publication Data

US 2018/0307752 A1 Oct. 25, 2018

Related U.S. Application Data

(63) Continuation of application No. 14/191,034, filed on Feb. 26, 2014, now Pat. No. 10,002,191.

(60) Provisional application No. 61/922,218, filed on Dec. 31, 2013.

(51) Int. Cl.
*G06F 16/632* (2019.01)
*G06F 16/78* (2019.01)
*G06F 16/783* (2019.01)

(52) U.S. Cl.
CPC .......... *G06F 16/632* (2019.01); *G06F 16/634* (2019.01); *G06F 16/78* (2019.01); *G06F 16/784* (2019.01); *G06F 16/7834* (2019.01)

(58) Field of Classification Search
None
See application file for complete search history.

(56) References Cited

U.S. PATENT DOCUMENTS

| 6,240,555 | B1 | 5/2001 | Shoff et al. |
| 6,901,366 | B1 | 5/2005 | Kuhn et al. |
| 7,421,376 | B1 | 9/2008 | Caruso et al. |

(Continued)

FOREIGN PATENT DOCUMENTS

| CN | 1471672 | 1/2004 |
| CN | 1518710 | 8/2004 |

(Continued)

OTHER PUBLICATIONS

Summons to Attend Oral Proceedings dated Jul. 12, 2018 in EP Patent Application No. 14830459.5.

(Continued)

*Primary Examiner* — Amresh Singh
(74) *Attorney, Agent, or Firm* — Byrne Poh LLP

(57) ABSTRACT

Methods, systems, and media for generating search results based on contextual information are provided. In some implementations, a method for presenting search results is provided, the method comprising: receiving, using a hardware processor, a query related to media that is currently being presented; identifying a program that is currently being presented; identifying a plurality of keywords associated with the identified program; determining one or more of the plurality of keywords that are contextually relevant to the query; obtaining a plurality of search results based on the query and the one or more contextually relevant keywords; and causing at least one of the plurality of search results to be presented to the user.

19 Claims, 5 Drawing Sheets

(56) References Cited

U.S. PATENT DOCUMENTS

| | | |
|---|---|---|
| 7,840,980 B2 | 11/2010 | Gutta |
| 8,185,543 B1 | 5/2012 | Choudhry et al. |
| 8,205,223 B2 | 6/2012 | Pack et al. |
| 8,392,951 B2 | 3/2013 | Park et al. |
| 8,484,017 B1 | 7/2013 | Sharifi et al. |
| 8,694,533 B2 | 4/2014 | Oztaskent et al. |
| 8,929,657 B2 | 1/2015 | Jung |
| 2002/0147984 A1 | 10/2002 | Tomsen et al. |
| 2007/0124756 A1 | 5/2007 | Covell et al. |
| 2007/0150462 A1 | 6/2007 | Nonaka et al. |
| 2008/0098432 A1 | 4/2008 | Hardracker et al. |
| 2008/0226119 A1 | 9/2008 | Candelore et al. |
| 2008/0229363 A1 | 9/2008 | Lanfermann et al. |
| 2009/0276805 A1 | 11/2009 | Andrews et al. |
| 2010/0036828 A1 | 2/2010 | Carmel et al. |
| 2010/0082585 A1 | 4/2010 | Barsook et al. |
| 2010/0131847 A1 | 5/2010 | Sievert et al. |
| 2010/0332967 A1 | 12/2010 | Kraft et al. |
| 2011/0022633 A1 | 1/2011 | Bernosky et al. |
| 2011/0093492 A1 | 4/2011 | Sull et al. |
| 2011/0103763 A1 | 5/2011 | Tse et al. |
| 2011/0125735 A1 | 5/2011 | Petrou |
| 2011/0184814 A1 | 7/2011 | Konkol et al. |
| 2011/0246495 A1 | 10/2011 | Mallinson |
| 2011/0247042 A1 | 10/2011 | Mallinson |
| 2011/0264700 A1 | 10/2011 | Mei et al. |
| 2011/0282906 A1 | 11/2011 | Wong |
| 2011/0289098 A1 | 11/2011 | Oztaskent et al. |
| 2012/0019352 A1 | 1/2012 | Menard et al. |
| 2012/0047156 A1 | 2/2012 | Jarvinen et al. |
| 2012/0078889 A1 | 3/2012 | Chu-Carroll et al. |
| 2012/0096499 A1 | 4/2012 | Dasher et al. |
| 2012/0117057 A1 | 5/2012 | Adimatyam et al. |
| 2012/0167144 A1 | 6/2012 | Avison-Fell |
| 2012/0227074 A1 | 9/2012 | Hill et al. |
| 2012/0240144 A1 | 9/2012 | Rose |
| 2012/0240177 A1 | 9/2012 | Rose |
| 2012/0291072 A1 | 11/2012 | Maddison et al. |
| 2012/0291073 A1 | 11/2012 | Friedman |
| 2012/0311623 A1 | 12/2012 | Davis et al. |
| 2012/0311641 A1 | 12/2012 | Allard |
| 2013/0036442 A1 | 2/2013 | Wingert |
| 2013/0047178 A1 | 2/2013 | Moon et al. |
| 2013/0086105 A1 | 4/2013 | Hammontree et al. |
| 2013/0104172 A1 | 4/2013 | Lee et al. |
| 2013/0104179 A1 | 4/2013 | Shah |
| 2013/0227622 A1 | 4/2013 | Landow et al. |
| 2013/0111514 A1 | 5/2013 | Slavin et al. |
| 2013/0139209 A1 | 5/2013 | Urrabazo et al. |
| 2013/0160038 A1 | 6/2013 | Slaney et al. |
| 2013/0179436 A1 | 7/2013 | Yun et al. |
| 2013/0272676 A1 | 10/2013 | Mo et al. |
| 2014/0089423 A1 | 3/2014 | Jackels |
| 2014/0250116 A1 | 9/2014 | Hsu et al. |
| 2014/0253472 A1 | 9/2014 | Ayoub et al. |
| 2014/0255003 A1 | 9/2014 | Abramson |
| 2014/0298211 A1 | 10/2014 | Mehta |
| 2014/0344670 A1 | 11/2014 | Simeon et al. |
| 2015/0193433 A1 | 7/2015 | Dykeman et al. |

FOREIGN PATENT DOCUMENTS

| | | |
|---|---|---|
| CN | 1735162 | 2/2006 |
| CN | 1804829 | 7/2006 |
| CN | 101566990 | 10/2009 |
| CN | 101883230 | 11/2010 |
| CN | 101981574 | 2/2011 |
| CN | 102833617 | 12/2012 |
| CN | 102868934 | 1/2013 |
| CN | 101557464 | 6/2013 |
| EP | 2388721 | 11/2011 |
| EP | 2501144 | 9/2012 |
| JP | 2001169269 | 6/2001 |
| JP | 2005092295 | 4/2005 |
| JP | 2006270869 | 10/2006 |
| JP | 2010154415 | 7/2010 |
| JP | 2011035628 | 2/2011 |
| JP | 2011517816 | 8/2011 |
| JP | 2011243204 | 12/2011 |
| JP | 2012118918 | 6/2012 |
| JP | 2013016030 | 1/2013 |
| JP | 2013529325 | 7/2013 |
| KR | 20060077988 | 7/2006 |
| KR | 20110125917 | 11/2011 |
| WO | WO 2002077864 | 10/2002 |
| WO | WO 2009/036435 | 3/2009 |
| WO | WO 2009/124002 | 10/2009 |
| WO | WO 2011/123718 | 10/2011 |
| WO | WO 2012/014130 | 2/2012 |
| WO | WO 2012/139240 | 10/2012 |
| WO | WO/2013/040533 | 3/2013 |

OTHER PUBLICATIONS

Office Action dated Sep. 5, 2018 in JP Patent Application No. 2016-543706.
Decision to Refuse a European Patent Application dated Nov. 15, 2018 in EP Patent Application No. 14725797.6.
Examination Report dated Feb. 6, 2018 in EP Patent Application No. 14830460.3.
International Search Report and Written Opinion of the International Search Authority dated Jul. 28, 2014 in International Patent Application No. PCT/US2014/024255.
International Search Report and Written Opinion of the International Search Authority dated Mar. 17, 2015 in International Patent Application No. PCT/US2014/072261.
Notice of Allowance dated May 24, 2016 in U.S. Appl. No. 14/191,059.
Notice of Allowance dated Jan. 22, 2018 in U.S. Appl. No. 15/649,370.
Notice of Allowance dated Mar. 16, 2017 in U.S. Appl. No. 15/272,027.
Notice of Allowance dated Apr. 17, 2015 in U.S. Appl. No. 13/827,413.
Notice of Allowance dated Jun. 5, 2015 in U.S. Appl. No. 13/826,910.
Notice of Allowance dated Nov. 9, 2016 in U.S. Appl. No. 15/005,470.
Office Action dated Jan. 16, 2015 in U.S. Appl. No. 14/191,059.
Office Action dated Jan. 20, 2016 in U.S. Appl. No. 14/191,059.
Office Action dated Jan. 23, 2018 in U.S. Appl. No. 15/431,431.
Office Action dated Jan. 30, 2015 in U.S. Appl. No. 13/826,910.
Office Action dated Feb. 6, 2018 in U.S. Appl. No. 14830460.3.
Office Action dated Mar. 13, 2018 in JP Patent Application No. 2016-501451.
Office Action dated Mar. 25, 2015 in U.S. Appl. No. 13/834,394.
Examination Report dated Apr. 13, 2017 in EP Patent Application No. 14725797.6.
Office Action dated Apr. 17, 2018 in CN Patent Application No. 201480021167.4.
Office Action dated Apr. 23, 2015 in U.S. Appl. No. 14/191,059.
Office Action dated May 18, 2016 in U.S. Appl. No. 13/826,910.
Office Action dated Jun. 29, 2017 in U.S. Appl. No. 15/431,431.
Office Action dated Jul. 5, 2018 in U.S. Appl. No. 15/431,431.
Office Action dated Jul. 27, 2016 in U.S. Appl. No. 15/005,470.
Office Action dated Sep. 20, 2018 in U.S. Appl. No. 16/005,048.
Office Action dated Nov. 17, 2017 in U.S. Appl. No. 15/649,370.
Office Action dated Dec. 1, 2016 in U.S. Appl. No. 15/272,027.
Office Action dated Dec. 9, 2014 in U.S. Appl. No. 13/827,413.
Office Action dated Dec. 21, 2018 in CA Patent Application No. 2,908,549.
Office Action dated Sep. 27, 2017 in U.S. Appl. No. 15/431,431.
Summons to Attend Oral Proceedings dated Feb. 2, 2018 in EP Patent Application No. 14725797.6.
YouTube, "Pharos Demonstration—Audiovisual Tunable Search—Part C", last updated Jan. 16, 2010, pp. 1, available at: https://www.youtube.com/watch?v=ZpxyNi6Ht50.
Examination Report dated Jan. 19, 2018 in EP Patent Application No. 14830459.5.
International Preliminary Report on Patentability dated Jul. 5, 2016 in International Patent Application No. PCT/US2014/072258.

(56) References Cited

OTHER PUBLICATIONS

International Search Report and Written Opinion of the International Search Authority dated Apr. 17, 2015 in International Patent Application No. PCT/US2014/072258.
Notice of Allowance dated Jan. 24, 2018 in U.S. Appl. No. 14/191,034.
Office Action dated Jan. 5, 2016 in U.S. Appl. No. 14/191,034.
Office Action dated Jun. 2, 2017 in U.S. Appl. No. 14/191,034.
Office Action dated Jul. 14, 2016 in U.S. Appl. No. 14/191,034.
Office Action dated Jul. 29, 2014 in U.S. Appl. No. 13/826,910.
Office Action dated Sep. 6, 2017 in U.S. Appl. No. 14/191,034.
Office Action dated Oct. 20, 2016 in U.S. Appl. No. 14/191,034.
U.S. Appl. No. 13/594,693, filed Aug. 24, 2012.
U.S. Appl. No. 13/826,910, filed Mar. 14, 2013.
U.S. Appl. No. 14/191,034, filed Feb. 26, 2014.
U.S. Appl. No. 61/922,218, filed Dec. 31, 2013.
Decision to Refuse a European Patent Application dated Jan. 14, 2019 in EP Patent Application No. 14830459.5.
Decision to Refuse a European Patent Application dated Oct. 9, 2019 in EP Patent Application No. 14830460.3.
Examination Report dated Mar. 16, 2020 in IN Patent Application No. 3412/KOLNP/2015.
Notice of Allowance dated Jan. 28, 2020 in JP Patent Application No. 2016-543706.
Notice of Allowance dated Mar. 25, 2020 in KR Patent Application No. 10-2015-7028591.
Notice of Allowance dated May 30, 2019 in U.S. Appl. No. 16/005,048.
Office Action dated Jan. 23, 2019 in CN Patent Application No. 201480071926.8.
Office Action dated Feb. 2, 2019 in CN Patent Application No. 201480071614.7.
Office Action dated Feb. 26, 2019 in U.S. Appl. No. 16/005,048.
Office Action dated Apr. 23, 2020 in CN Patent Application No. 201480021167.4.
Office Action dated May 15, 2019 in AU Patent Application No. 2014374036.
Office Action dated Jun. 1, 2020 in U.S. Appl. No. 16/600,916.
Office Action dated Jun. 4, 2019 in JP Patent Application No. 2016-543706.
Office Action dated Jul. 22, 2019 in CN Patent Application No. 201480071614.7.
Office Action dated Jul. 22, 2019 in CN Patent Application No. 201480071926.8.
Office Action dated Jul. 25, 2019 in CN Patent Application No. 201480021167.4.
Office Action dated Dec. 16, 2019 in CA Patent Application No. 2,908,549.
Summons to Attend Oral Proceedings dated Feb. 18, 2019 in EP Patent Application No. 14830460.3.
Office Action dated Sep. 21, 2020 in U.S. Appl. No. 16/600,916, pp. 2-11.
Office Action dated Jan. 19, 2021 in CA Patent Application No. 2,935,568.
Office Action dated Dec. 28, 2020 in KR Patent Application No. 10-2016-7018931.
Office Action dated Dec. 28, 2020 in KR Patent Application No. 10-2016-7020499.
Notice of Allowance dated Dec. 30, 2020 in U.S. Appl. No. 16/600,916.

METHODS, SYSTEMS, AND MEDIA FOR GENERATING SEARCH RESULTS BASED ON CONTEXTUAL INFORMATION

CROSS-REFERENCE TO RELATED APPLICATIONS

This application is a continuation of U.S. patent application Ser. No. 14/191,034, filed on Feb. 26, 2014, which claims the benefit of U.S. Provisional Patent Application No. 61/922,218, filed Dec. 31, 2013, each of which is hereby incorporated by reference herein in its entirety.

TECHNICAL FIELD

Methods, systems, and media for generating search results based on contextual information are provided.

BACKGROUND

When watching a program such as a movie or television program, users often have questions about the contents of the program, such as the name of an actor in the program, the location of the program, what else the actor has been in, details about the program, the plot of the program, among many other questions. Finding the answers to these questions often involves the user performing multiple steps, such as figuring out the name of the program, searching for details about the program using a search engine or database of program information, and combing through the search results or database entries, which may not be relevant to the users question to try to figure out the answer. This can be a time consuming procedure for the user and can cause the user to miss a substantial portion of the program or otherwise disrupt the user's viewing experience.

Accordingly, new methods, systems, and media for generating search results based on contextual information are desirable.

SUMMARY

In accordance with some implementations of the disclosed subject matter, mechanisms for generating search results based on contextual information are provided.

In accordance with some implementations of the disclosed subject matter, a method for presenting search results is provided, the method comprising: receiving, using a hardware processor, a query related to media that is currently being presented; identifying a program that is currently being presented; identifying a plurality of keywords associated with the identified program; determining one or more of the plurality of keywords that are contextually relevant to the query; obtaining a plurality of search results based on the query and the one or more contextually relevant keywords; and causing at least one of the plurality of search results to be presented to the user.

In accordance with some implementations of the disclosed subject matter, a system for presenting search results is provided, the system comprising: a hardware processor programmed to: receive a query related to media that is currently being presented; identify a program that is currently being presented; identify a plurality of keywords associated with the identified program; determine one or more of the plurality of keywords that are contextually relevant to the query; obtain a plurality of search results based on the query and the one or more contextually relevant keywords; and cause at least one of the plurality of search results to be presented to the user.

In accordance with some implementations of the disclosed subject matter, a non-transitory computer-readable medium containing computer executable instructions that, when executed by a processor, cause the processor to perform a method for presenting search results is provided, the method comprising: receiving a query related to media that is currently being presented; identifying a program that is currently being presented; identifying a plurality of keywords associated with the identified program; determining one or more of the plurality of keywords that are contextually relevant to the query; obtaining a plurality of search results based on the query and the one or more contextually relevant keywords; and causing at least one of the plurality of search results to be presented to the user.

In accordance with some implementations of the disclosed subject matter, a system for presenting search results is provided, the system comprising: means for receiving a query related to media that is currently being presented; means for identifying a program that is currently being presented; means for identifying a plurality of keywords associated with the identified program; means for determining one or more of the plurality of keywords that are contextually relevant to the query; means for obtaining a plurality of search results based on the query and the one or more contextually relevant keywords; and means for causing at least one of the plurality of search results to be presented to the user.

In some implementations, the query is received from a first device and the media is presented by a second device, and the at least one of the plurality of search results is presented by the first device.

In some implementations, the system further comprises means for receiving audio data from the first device; means for causing a first audio fingerprint of the received audio data to be compared to audio fingerprints corresponding to a plurality of programs; and means for receiving an identity of a first program of the plurality of programs to which the first audio fingerprint corresponds based on the comparison; wherein the program that is currently being presented is identified based on the received identity of the first program.

In some implementations, the system further comprises means for receiving a portion of the first program that is currently being presented based on a comparison of the first audio fingerprint to a plurality of audio fingerprints associated with the first program, wherein each of the plurality of audio fingerprints associated with the first program correspond to a particular portion of the first program.

In some implementations, the means for determining one or more of the plurality of keywords that are contextually relevant to the query comprises means for determining that the one or more of the plurality of keywords are associated with the portion of the first program that is currently being presented.

In some implementations, the means for identifying the plurality of keywords comprises: means for querying a database of keywords associated with a plurality of programs for keywords associated with the program; and means for receiving keywords associated with the program from the database of keywords in response to the database query.

In some implementations, the means for determining one or more of the plurality of keywords that are contextually relevant to the query comprises means for determining that the one or more of the plurality of keywords are of a type that is responsive to at least a portion of the query using natural language processing.

In some implementations, the keywords correspond to objects of interest that appear in the program.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements

DETAILED DESCRIPTION

Figure 1:
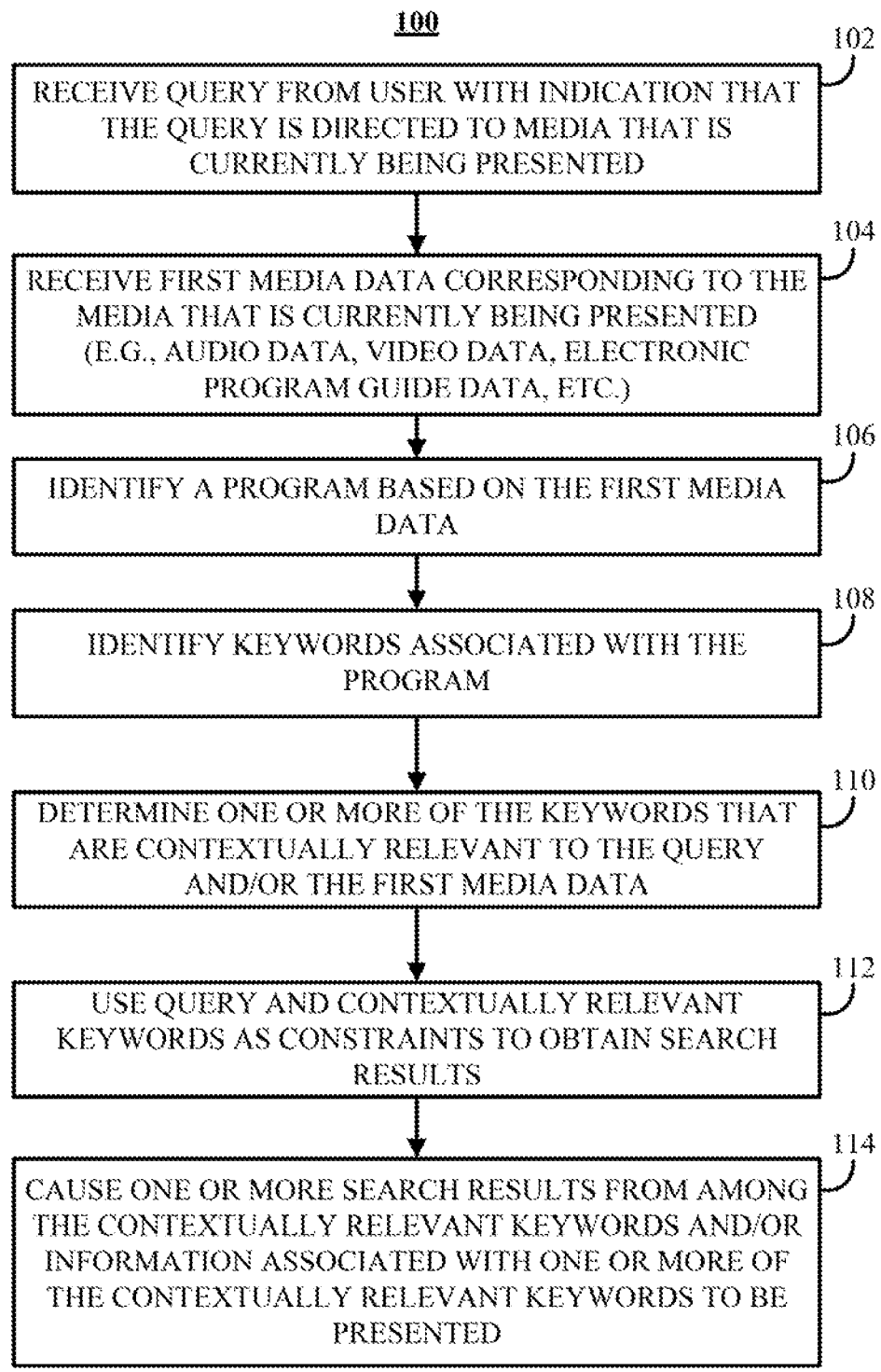
FIG. 1 shows an example of a process for generating search results based on contextual information in accordance with some implementations of the disclosed subject matter.

In accordance with some implementations of the disclosed subject matter, mechanisms for generating search results based on contextual information are provided.

In some implementations, the mechanisms described herein can receive a query related to media content that is currently being presented. For example, the mechanisms can receive a query from a smartphone, where the query is related to media content that is currently being presented at the location of the smartphone. In a more particular example, the query can include the phrase "where do I know that character on TV right now from?"

In some implementations, in connection with the query, the mechanisms described herein can receive media data related to the media content that is currently being presented. For example, the mechanisms can receive audio data and/or an audio fingerprint based on audio recorded by the smartphone. This media data can be used by the mechanisms described herein to identify a program that is currently being presented, in some implementations. Information about what is being presented can be determined by the mechanisms described herein based on the identity of the program. For example, the audio fingerprint can be used to determine a portion of the program that is being presented, and the identity of actors (or characters) that appear in video data during that portion of the program can be determined based on the portion. This information (e.g., which actors are being presented in the video data) can, in some implementations, be used by the mechanisms described herein in obtaining search results responsive to the query. Additionally, in some implementations, the mechanisms described herein can use contextual information from the query in obtaining search results responsive to the query In some implementations, the mechanisms described herein can cause the search results to be presented to the user. For example, the mechanisms described herein can receive the query "where do I know that character on TV right now from?" from a smartphone, and audio data recorded by the smartphone. The mechanisms described herein can determine that the program that corresponds to the audio is "Program Z" and that the audio corresponds to a portion of the program during which the people "Actor A" and "Actor B" appear in the video data. Based on the context of the query, the mechanisms described herein can determine that the query is related to a person that appears in the video data during the identified portion of the program, and that the query is related to what else the person has appeared in. The mechanisms described herein can obtain search results for what both "Actor A" and "Actor B" have appeared in, if it cannot be determined to which person the query was directed. The mechanisms can then cause the search results to be presented by the smartphone. For example, the search results can include the actors' names (e.g., "Actor A," "Actor B," etc.), an image of the actors, what they appeared in (e.g., organized chronologically, by popularity, etc.), and/or any other suitable information.

Turning to FIG. 1, an example 100 of a process for generating search results based on contextual information is shown in accordance with some implementations of the disclosed subject matter. As shown in FIG. 1, process 100 can begin by receiving a query from a user, at 102, with an indication that the query is directed to media that is currently being presented. The query can be received using any suitable technique or techniques. For example, in some implementations, process 100 can receive the query from a computing device which was used to compose the query. The query can be composed by the computing device using any suitable technique or techniques. For example, the query can be composed in a search field associated with a search engine accessed using a web browser on a computing device such as a smartphone, a tablet computer, a wearable computer, a laptop computer, etc. As another example, the query can be composed in a search field associated with a search engine accessed using a search application installed on the computing device (e.g., an application that is not a general function web browser). As yet another example, the query can be composed in a search field associated with an application for finding and presenting information about media content that is currently being presented. In a more particular example, the query can be composed in a search field of an audio fingerprinting application that receives audio data and uses the audio data to identify media that is currently being presented. As still another example, the query can be composed by an operating system or other application running on the computing device (which may, in some implementations, be running in the background), which can interpret the query and communicate with a search engine, or the like, to obtain search results.

In some implementations, the search query can be composed using any suitable technique. For example, the device used to compose the query can receive text that is input by a user with a keyboard or any other suitable device for entering the text of the query. As another example, the device composing the query can receive audio (e.g., by the user speaking the query), and can compose the query based on the audio (e.g., by processing the audio to extract words and create a query based on the words).

In some implementations, process 100 can receive an indication that the query is directed to media that is currently being presented using any suitable technique or techniques.

For example, the query received at 102 can include an indication that the query is directed to media that is currently being presented. In a more particular example, the query can include a phrase such as "on TV now," "this show," "this movie," "on screen now," and/or any other phrase that indicates that the answer to the query is related to media that is currently being presented. In some implementations, the query must include a particular phrase (or close variant of a particular phrase) to initiate a query related to media content that is currently being presented.

As another example, the query received at 102 can be received from an application or web page programmed to compose queries directed to media that is currently being presented. In such an example, process 100 can determine that the query is related to media that is currently being presented based on the application and/or web page from which the query originated.

At 104, process 100 can receive first media data corresponding to media that is currently being presented. In some implementations, process 100 can receive audio data that includes audio data of the program that is currently being presented. For example, the computing device used to compose the query received at 102 can record a portion of audio of the media content that is presented by a device that is currently presenting the media content. This audio can be received by the device executing process 100. As another example, process 100 can receive an audio fingerprint for the media content generated based on a portion of audio data recorded from the media content being presented. In such an example, the audio fingerprint can be created by the device used to compose the query, or another device such as a server running a process for generating an audio fingerprint from audio data.

In some implementations, process 100 can receive metadata associated with the media content that is currently being presented. For example, process 100 can receive electronic program guide data associated with the media content that is currently being presented. As another example, process 100 can receive metadata associated with the program (e.g., metadata transmitted with the program from a content provider).

In some implementations, process 100 can receive image data that includes at least a portion of image data of the media content that is currently being presented. This image data can, for example, include video data of the media content captured by a device used to compose the query received at 102. For example, the computing device used to compose the query received at 102 can record a portion of video of the media content that is presented by a device that is presenting the media content. This video can be received by the device executing process 100. As another example, process 100 can receive a video fingerprint for the media content created from a portion of video data created from the media content being presented. In such an example, the video fingerprint can be created by the device used to compose the query, or another device such as a server running a process for generating a video fingerprint from video data.

In some implementations, process 100 can receive data about media content that is being presented which can include various information about the media content. For example, the data about the media content can include a service provider from which the content was received, a channel on which the content was presented, a time at which the content was presented, a title of the content, and/or any other suitable data about the media content that is being presented. In some implementations, the data about the media content can be received from a computing device that was used to compose the query at 102, which can generate the data using any suitable technique. For example, the computing device that was used to compose the query can identify the program by capturing audio data (and/or generating an audio fingerprint) and using a service for identifying media data based on audio data to identify the program. Such a service can provide program data of an identified program. As another example, the computing device that was used to compose the query can prompt a user to enter information about the media content that is currently being presented such as a content provider (e.g., a cable, satellite, or telephone provider that provided the content, or whether the content was received as a broadcast via an antenna), a channel on which the program is and/or was presented (e.g., a channel of the content provider), a date and/or time at which the content was presented (which can be the current time for content that is currently being received and presented from the content provider), etc.

At 106, process 100 can identify the program that is being presented based on the first media data received at 104. Any suitable technique or techniques can be used to identify the media data. For example, in some implementations, audio data received at 104 can be used to generate an audio fingerprint for the media content that is currently being presented. This audio fingerprint can be compared to audio fingerprints that are known to correspond to particular media content, and the media content currently being presented can be identified based on the comparison. As another example, an audio fingerprint received at 104 can be used to identify the media content (e.g., rather than receiving audio and generating the audio fingerprint based on the received audio). As yet another example, electronic program guide information and/or metadata received at 104 can be compared to electronic program guide information and/or metadata that are known to correspond to particular media content, and the media content currently being presented can be identified based on the comparison. As still another example, the image data, video data and/or video fingerprint data received at 104 can be compared to similar data that are known to correspond to particular media content, and the media content currently being presented can be identified based on the comparison. In a more particular example, the image data received at 104 can include a code such as a barcode, a QR code, and/or any other suitable type of visual code for visually encoding information. As another more particular example, the image data and/or video data received at 104 can include data that is stegenographically encoded, and process 100 can cause this encoded data to be extracted from the image data and/or video data. As a further example, the data about the program received at 104 can be used to identify the media content that is currently being presented and/or can be compared to program data known to correspond to particular media content, and the media content currently being presented can be identified based on the comparison.

In some implementations, process 100 can access a database of media data (e.g., audio fingerprints, metadata, video fingerprints, and/or any other suitable media data) corresponding to known programs. For example, in order to identify, at 106, the media that is currently being presented, process 100 can access the database in order to compare the audio fingerprint received at 104 to audio fingerprints in the database that correspond to known programs.

In some implementations, process 100 can identify a portion of the program that corresponds to the currently presented media. For example, the database of media data can identify a particular portion of a program that corresponds to the currently presented media. In a more particular example, an audio fingerprint generated from the program can be associated with a portion of the program having audio data that corresponds to the audio fingerprint. As described below in connection with FIG. 3, audio fingerprints can be generated from audio of a program that is received from a content source. Each of these audio fingerprints can be associated with the portion of the program having audio that corresponds to the audio fingerprint. These audio fingerprints can be stored, for example, in a database of audio fingerprints in association with information identifying the program and a portion of the program to which the audio fingerprint corresponds. Upon comparing the audio fingerprint of the media currently being presented to the database of audio fingerprints of known programs, process 100 can identify the program to which the media that is currently being presented corresponds, as well as a portion of the program to which the media that is currently being presented corresponds. In some implementations, the portion of the program can be identified using timing information (e.g., a time within the program having audio that corresponds to the audio fingerprint).

In some implementations, a portion of a program that corresponds to the currently presented media content can be determined using any other suitable information (e.g., other than an audio fingerprint), such as video fingerprints, electronic program guide data, metadata of the program, timing information from a device presenting the program, timing information from a service for identifying media content that is currently being presented, etc.

At 108, process 100 can identify keywords associated with the program identified at 106. In some implementations, keywords can correspond to and represent entities from the program and/or the program itself. For example, keywords can include people, places, events, objects, creatures, logos, characteristics, features, plots, music, unusual or scientific words, products, brands, and/or any other suitable entity related to the program. These keywords can be associated with the program in various ways. For example, an image of a person or a landmark can be included in video data associated with the program. As another example, a person or an event can be discussed in the program (e.g., the names of people or words identifying an event can be included in audio data and/or subtitle data associated with the program). As yet another example, a place can be identified in a program through text included in video data associated with the program and/or through audio data associated with the program. As still another example, keywords can be included in text associated with the program such as metadata, electronic program guide data, and/or any other text associated with the program. It should be noted that the preceding are merely examples and it is recognized that keywords can be associated with a program in many different ways.

As described below in connection with FIG. 3, any suitable technique or techniques can be used to associate particular keywords with the identified program. For example, in some implementations, keywords can be associated with the program based on a cast of the program extracted from metadata, based on electronic program guide data, and/or found by searching a database of cast information for programs that can be searched using the title of a program (or any other suitable information about the program). As another example, keywords can be associated with the program based on facial recognition techniques to identify people included in one or more screenshots from video data associated with the program. As yet another example, keywords can be associated with the program based on image recognition techniques to identify landmarks included in one or more screenshots extracted from video data associated with the program. As still another example, keywords can be associated with the program based on optical character recognition techniques to identify keywords included in one or more screenshots extracted from video data associated with the program.

In some implementations, keywords can be associated with a particular portion of a program. For example, an identity of a person that appears in the program can be a keyword, and the portion or portions when the person appears in the program can be associated with that keyword. If that same person is also a cast member of the program, the keyword for the person can also be associated with the program as a whole with no particular portion of the program associated with the keyword. As another example, keywords that appear in metadata or electronic program guide data can be associated with the program without also being associated with a particular portion of the program. As yet another example, text that appears in a program can be associated with a portion of the program in which the text appears in the video data, audio data, subtitle data, etc.

In some implementations, the keywords associated with the program can be stored, for example in a database of keyword data, in association with various programs. In some implementations, a type of entity to which the keyword corresponds in the context of the program can be associated with the keyword. For example, if the keyword corresponds to a person that appears in the program, the keyword can be identified as a person keyword, a cast keyword, etc. As another example, if the keyword corresponds to a building or landmark that appears in the program, the keyword can be identified as a building keyword, a landmark keyword, etc. In some implementations, process 100 can access the keyword database at 108 to identify keywords associated with the program identified at 106.

At 110, process 100 can determine one or more of the identified keywords that that are contextually relevant to the query and/or that are contextually relevant to the first media data received at 104. In some implementations, process 100 can determine whether a particular keyword is contextually relevant to the query using natural language processing. For example, if the query includes the phrase "who is" or a similar phrase, process 100 can determine that keywords that are contextually relevant are keywords that correspond to people. As another example, if the query includes the phrase "what else has the person on TV been in?", process 100 can determine that keywords that are contextually relevant are keywords that correspond to people because the query requires that the person in the media that is currently being presented be identified. As yet another example, if the query includes the phrase "when," process 100 can determine that keywords that are contextually relevant are keywords that correspond to time. Any suitable technique for determining types of keywords that are relevant can be used. For example, any suitable natural language processing can be used by the mechanisms described herein to determine what type of keywords are contextually relevant to the query. In some implementations, the query can be submitted to a natural language processing server for performing natural language processing and determining the context of the query.

In some implementations, process 100 can determine whether a particular keyword is contextually relevant to the query based on the first media data received at 104. For example, as described above in connection with 106, the first media data can be used to determine a portion of the program to which the media that is currently being presented corresponds. In some implementations, based on the context of the query, process 100 can determine whether the query is a time-sensitive query. For example, a time-sensitive query can be related to something that is currently being presented rather than the program in general. In a more particular example, "who is on TV right now?" can be a time-sensitive query, while "when did this movie come out?" may not be time-sensitive because it applies to the program generally and not a portion of the program that is currently being presented.

In some implementations, rather than identifying keywords associated with the program at 108, and identifying contextually relevant keywords at 110, process 100 can determine a context of the query and/or the first media data, and use the context when identifying keywords. For example, process 100 can determine that the first media data corresponds to a particular portion of the program, and can then identify only keywords that correspond to the particular portion or that correspond to the program generally (e.g., that do not correspond to any particular portion of the program). As another example, process 100 can determine that the query pertains to a person, and can identify only keywords that correspond to people (e.g., not keywords that correspond to landmarks, places, etc.).

At 112, process 100 can obtain search results based on at least a portion of the query and the contextually relevant keywords identified at 110. In some implementations, process 100 can access a search engine to obtain search results that are contextually relevant to both the query received at 102 and at least one of the contextually relevant keywords identified at 110. For example, if the query is related to a person included in video that is currently being presented such as "who is that person on TV?", process 100 can access a search engine using the query and contextually relevant keywords identified at 110 (e.g., cast members associated with a portion of the program that is currently being presented). In some implementations, the contextually relevant keywords identified at 110 can be passed to the search engine as constraints on the search. For example, the search engine can be constrained to determine search results only related to the contextually relevant keywords.

In some implementations, the search results can include information about the contextually relevant keywords identified at 110 such as an image, descriptive information about the keyword (e.g., biographical information about a cast member, background information about a landmark, etc.), and/or any other relevant information about the keyword.

At 114, process 100 can cause one or more of the search results from among the contextually relevant keywords and/or information associated with one or more of the contextually relevant keywords to be presented. In some implementations, any suitable number of search results can be presented in response to the query. For example, search results for each of the contextually relevant keywords identified at 110 can be presented to the user. As another example, each of the search results can be associated with a confidence parameter (and/or any other suitable parameter) that indicates a probability that a particular result is relevant to the query. In such an example, only search results with a confidence parameter over a threshold confidence can be presented and/or a predetermined number of search results having highest confidence parameters can be presented.

In some implementations, process 100 can cause the search results to be presented by transmitting the results to a device that composed and sent the query. For example, if the query was composed on a mobile computing device and sent using a web browser, process 100 can transmit the results to the mobile device, which can in turn present the search results on a display of the mobile device using the web browser (or any other suitable application).

In some implementations, the search results that are caused to be presented at 114 can include a hyperlink to further information about the keyword with which the search results are associated. For example, a search result for an actor can include a link to a web page that includes biographical information about the actor. As another example, a search result for an actor can include a link to a web page that includes information on other programs in which the actor appeared.

Figure 2:
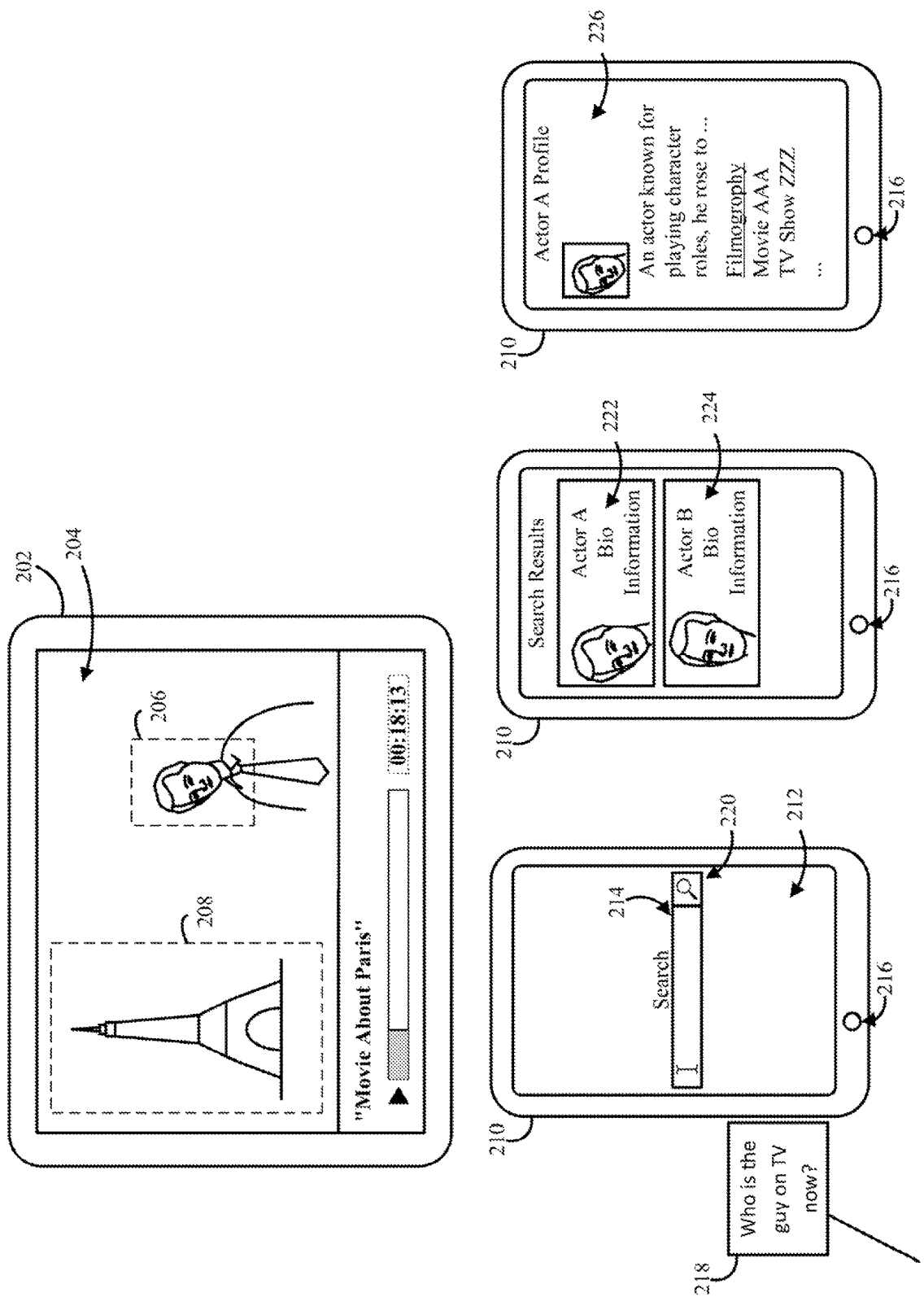
FIG. 2 shows an illustrative example of a device that is providing media content, such as a television program, and a mobile device that, upon receiving a search query, provides search results based on the query and the television program in accordance with some implementations of the disclosed subject matter.

FIG. 2 shows an example of a device that is presenting media content and a device that is used to compose a query related to the media content. As shown in FIG. 2, a media playback device 202 having a display 204 can present media content, such as a movie, using display 204 and speakers (not shown).

The media that is currently being presented by media playback device 202 can include video showing a person 206 and a landmark 208 among other things. As described above in connection with 108, for example, an identity of person 206 and landmark 208 can be keywords that are associated with the program (e.g., "Movie About Paris") and with a particular portion of the program (e.g., the portion associated with time 0:18:13). The media that is currently being presented by media playback device 202 can also include audio such as dialogue, a soundtrack, background noise, etc.

In some implementations, as shown in FIG. 2, a mobile device 210 can present a user interface 212 for composing a query to be used in performing a search. For example, a web browser running on mobile device 210 can be used to access a search engine web page having a search field 214 in which a query can be composed. In some implementations, mobile device 210 can compose a query in search field 214 based on inputs to a keyboard (not shown) associated with mobile device 210 and/or based on audio data received using a microphone 216 associated with mobile device 210.

As shown in FIG. 2, a user can speak a query 218 that can be recorded by microphone 216 as audio data. In the example shown in FIG. 2, spoken query 218 can include the phrase "who is the guy on TV now?" Mobile device 210 can use the audio data recorded by microphone 216 to compose a search query to be used in search field 214. Any suitable technique or techniques can be used to compose the search query from the audio data recorded by microphone 216 such as speech recognition techniques. Such speech recognition techniques can be performed by mobile device 210 or can be performed by a device for performing speech recognition techniques. For example, mobile device 210 can send the audio data recorded by microphone 216 (and/or other suitable data created from the audio data) to a server that performs speech recognition. The results of these speech recognition techniques can be used to compose a query to be used in search field 214.

In some implementations, a search can be initiated upon selection of a search user interface element 220 (e.g., a button in user interface 212). Additionally or alternatively, mobile device 210 can initiate the search in response to selection of any other suitable user interface element, such as a "done" or "enter" key on a keyboard, and/or can initiate the search in response to the query being composed (e.g., in response to completing a speech recognition technique). In some implementations, the search can be initiated in response to any other suitable condition and/or criterion being met, and/or any suitable combination of conditions and/or criteria being met.

In some implementations, upon initiating the search mobile device 210 can cause the query composed using user interface 212 to be transmitted to a remote device (e.g., a server) which can perform a search and/or generate search results responsive to the query. For example, the server can use process 100 to generate search results to be presented by mobile device 210.

As shown in FIG. 2, search results 222 and 224 can be presented as search results responsive to a query composed using user interface 212. For example, user interface 212 can be used to compose a query based on spoken query 218. In some implementations, mobile device 218 can record audio (e.g., using microphone 216) to be used in identifying the media that is currently being presented (e.g., by media playback device 202). For example, in response to mobile device 218 (or a remote server to which the query was submitted) determining that the query is directed to media that is currently being presented, mobile device 218 can record a portion of audio being presented in association with video being presented by display 204. This audio can then be used by a device executing process 100 to identify media that is currently being presented in a location shared by mobile device 210.

In some implementations, search results 222 and 224 can be returned to mobile device 210 from a device executing process 100. As shown, search result 222 can correspond to an actor ("Actor A") that appears on display 204 during a portion of the program that is being presented when the spoken query 218 is received. As described above in connection with FIG. 1 (e.g., at 108), an identity of person 206 can be a keyword that is associated with the portion of the program that is currently being presented. Search result 224 can correspond to another actor ("Actor B") that appears on display 204 during a portion of the program that is closely related to the portion that is currently being presented (e.g., the portion associated with the audio recorded by mobile device 210).

In some implementations, search results 222 and 224 can include images associated with Actor A and Actor B, respectively, as well as biographical information. As described above in connection with FIG. 1, search results 222 and 224 can include hyperlinks that, when selected, cause mobile device 218 to present additional information related to the search results. For example, if a user selects search result 222, a hyperlink associated with search result 222 can cause mobile device 210 to request a web page 226 that includes additional information about Actor A, as shown in FIG. 2.

Figure 3:
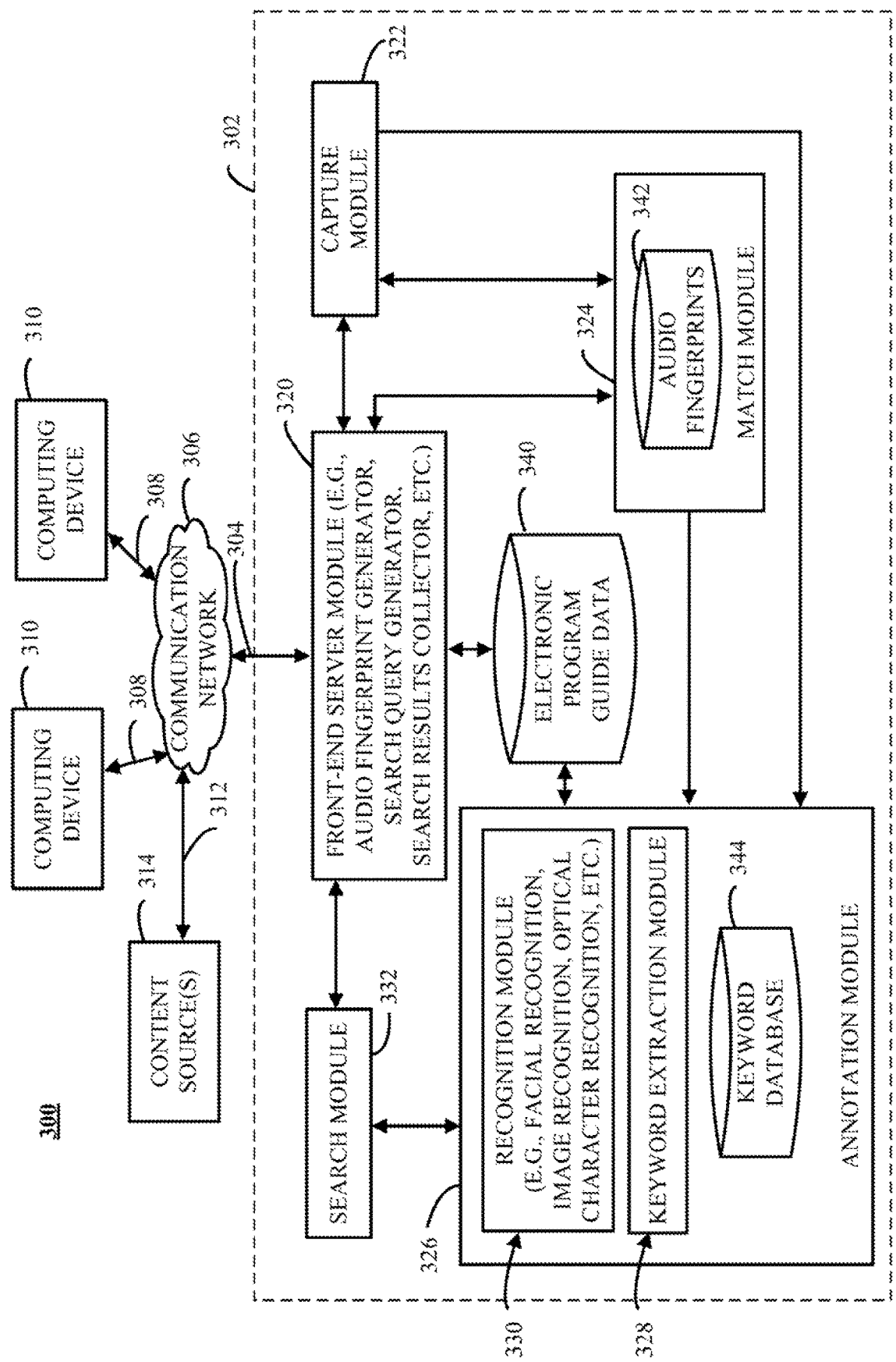
FIG. 3 shows a schematic diagram of an illustrative system suitable for implementation of the mechanisms described herein for generating search results based on contextual information in accordance with some implementations of the disclosed subject matter.

Turning to FIG. 3, an illustrative example 300 of a generalized schematic diagram of a system on which the mechanisms for generating search results based on contextual information is shown in accordance with some implementations of the disclosed subject matter. As shown in FIG. 3, system 300 can include one or more computing devices 310. Computing devices 310 can be connected by one or more communication links 308 to a communications network 306 that can be linked via a communications link 304 to a server 302. In some implementations, computing devices 304 and server 302 can be linked via a communications link 312 to one or more content sources 314.

System 300 can include one or more servers 302. Server 302 can be any suitable server for providing access to the mechanisms described herein, such as a processor, a computer, a data processing device, and/or any suitable combination of such devices. For example, the mechanisms described herein can be distributed into multiple backend components and multiple frontend components and/or interfaces. In a more particular example, backend components, such as data collection and data distribution, indexing and searching information, and/or any other suitable components can be performed on one or more servers 302. In another more particular example, frontend components, such as a user interface for receiving search queries, gathering media data to be used in identifying media that is currently being presented, presenting search results, and/or any other suitable components can be performed on one or more computing devices 310.

In some implementations, each of the computing devices 310 and server 302 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 310 can be implemented as a smartphone, a tablet computer, a wearable computer, a television, a smart television, a set-top box, a digital media receiver, a game console, a personal computer, a laptop computer, a personal data assistant (PDA), a home entertainment system, a stereo receiver, speakers, a projector, a game console, and/or other suitable device, and/or any suitable combination thereof. In some implementations, for example, a program can be presented using a first computing device 310, such as a smart television, a set-top box, a digital media receiver, etc., and a second computing device 310, such as a tablet computer, a smartphone, a wearable computer, a PDA, a game console, etc., can compose queries, record and/or transmit media data related to the program that is being presented by the first computing device, cause a search to be performed based on the query and/or the media data related to the program that is being presented, present search results that are contextually relevant to the query (e.g., generated based on process 100), and/or perform any other suitable functions.

In some implementations, content source(s) 314 can be any suitable content sources, such as a cable (or telephone) television content source, a satellite television content source, an on-demand program content source, an over-the-top program content source, an Internet content source, a streaming program content source, any other suitable content source, and/or any suitable combination thereof.

In some implementations, communications network 306 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 304, 308 and 312 can be any communications links suitable for communicating data among computing devices 310, server 302 and/or content source(s) 314, such as network links, dial-up links, wireless links, hard-wired links, any other suitable communications links, and/or any suitable combination of such links. Computing devices 310 can enable use of the techniques described herein that can allow the features of the mechanisms described herein to be used. Computing devices 310, server 302 and content source(s) 314 can be located at any suitable location.

In some implementations, server 302 can include one or more modules 320-332 and/or databases 340-344 which can be interconnected, for performing various functions of the mechanisms described herein and/or facilitating the mechanisms described herein for generating search results based on contextual information.

In some implementations, a front-end server module 320 can perform processes for generating search results based on contextual information as described above in connection with, for example, FIGS. 1 and 2.

In some implementations, a capture module 322 can receive media data related to a program, such as video data, audio data, electronic program guide data, metadata, etc., as described above in connection with, for example, FIG. 1. Additionally or alternatively, capture module 322 can extract various media data from content provided from content sources. Such extracted media data can include, for example, audio fingerprints, subtitles, video screenshots, etc. This information can be stored, for example, in a database (not shown) for use by front-end server module 320 in identifying keywords and/or various other operations.

In some implementations, a match module 324 can receive audio fingerprint data for a program from, for example, capture module 322 and store the received audio fingerprint data in a fingerprint database 342. Fingerprint database 342 can be used, for example, to identify a program at 106 of FIG. 1 as described above, to identify media that is currently being presented and which is related to the query received at 102.

In some implementations, an annotation module 326 can extract one or more keywords associated with a program based on data captured by capture module 322 and/or information extracted by capture module 322, such as audio fingerprints, video screenshots, subtitles, etc. For example, annotation module 326 can include a keyword extraction module 328 that can extract keywords from the data and/or information received from the capture module using a recognition module 330 configured to perform recognition techniques, such as facial recognition techniques, image recognition techniques, optical character recognition techniques, etc., to identify people, objects, landmarks, places, and/or any other suitable keywords that are mentioned and/or appear in the program with which the keywords are to be associated.

In some implementations, keyword extraction module 328 can extract keywords, such as the keywords described above in connection with FIG. 1. For example, keyword extraction module 328 can extract the identity of people, places, events, objects, creatures, logos, characteristics, features, plots, music, unusual or scientific words, products, brands, and/or any other suitable keywords. Additionally or alternatively, keyword extraction module 328 can identify keywords using recognition module 330, which can, for example, compare information from an image(s) of a face(s) from video screenshots (e.g., captured by capture module 322) to a database of known face information (e.g., face information of known individuals) to determine an identity of a person or persons in the image(s). Similarly, recognition module 330 can, for example, compare information from an image(s) of an object(s), such as buildings, statutes, product packaging, electronics, fruit and vegetables, or any other suitable object to a database of known object information to determine an identity of an object in an image. As described above, any suitable recognition techniques can be used by recognition module 330 to facilitate keyword extraction from program related data by keyword extraction module 328 and/or annotation module 326.

In some implementations, annotation module 326 can associate keywords extracted from, for example, audio data or video data with a portion of a program during which the keyword appears in such data. For example, keywords and those keywords associations with various programs can be stored in a keyword database, which can be periodically updated with information generated by annotation module 326 and/or can be periodically updated to remove keywords, programs and/or associations between keywords and programs corresponding to programs that have not been presented (e.g., by content sources 314) within a predetermined period of time.

In some implementations, a search module 332 can be used in obtaining search results at 112. For example, search module 332 can use the query received at 102 and/or contextually relevant keywords identified at 110 as inputs to be used by a search engine to generate search results that are contextually relevant to the query.

In some implementations, an electronic program guide (EPG) database 340 can store guidance data corresponding to electronic program guide data which can be provided by third parties, such as content publishers or broadcasters. Additionally, EPG database 340 can provide information about one or more programs provided from, for example, content source(s) 314.

It should be noted that, although modules 320-332 and databases 340-344 are shown as being included in server 302, these modules and/or databases can be provided in different servers (and/or other suitable computing devices) in various combinations. For example, search module 332 can be provided on a first server and modules 320-330 can be provided on a second server. As another example, each module can be provided on a different server. It should be noted that these are merely examples, and the modules described can be organized in any suitable manner.

It should also be noted that modules 320-332 can be included as part of the mechanisms described herein, can be separate mechanisms, and/or can be part of any other suitable mechanisms. For example, in some implementations, keywords can be associated with programs using any suitable technique and are not necessarily associated by a party that also executes process 100. In a more particular example, a party, such as a corporation, can associate keywords with programs from content sources 314 using any suitable technique and can make the keywords associated with a program accessible to others on any suitable terms. In another more particular example, a company can maintain a database of keywords associated with programs and/or which portions of the program the keyword is associated and can allow the database to be freely accessed or accessed for some form of remuneration.

Figure 4:
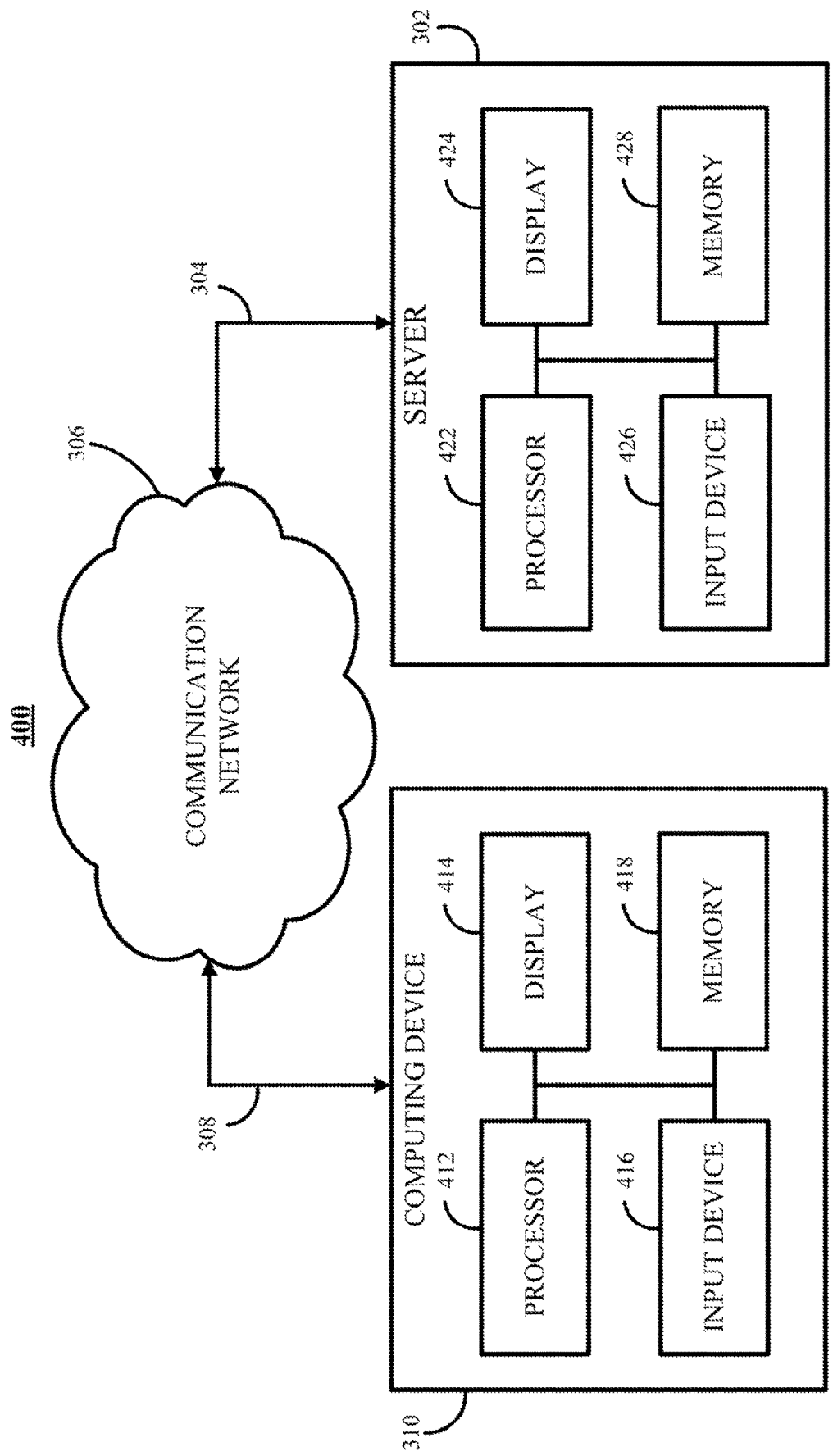
FIG. 4 shows a detailed example of a server and one of the computing devices of FIG. 3 that can be used in accordance with some implementations of the disclosed subject matter.

FIG. 4 illustrates an example 400 of hardware that can be used to implement server 302 and one of computing devices 310 depicted in FIG. 4 in accordance with some implementations of the disclosed subject matter. Referring to FIG. 4, computing device 310 can include a hardware processor 412, a display 414, an input device 416, and memory 418, which can be interconnected. In some implementations, memory 418 can include a storage device (such as a non-transitive computer-readable medium) for storing a computer program for controlling hardware processor 412.

Hardware processor 412 can use the computer program to present on display 414 content and/or a user interface that allows a user to access the mechanisms described herein and to send and receive data through communications link 308. It should also be noted that data received through communications link 308 or any other communications links can be received from any suitable source. In some implementations, hardware processor 412 can cause data to be sent and received through communications link 308 and/or any other communication links using, for example, a transmitter, receiver, transmitter/receiver, transceiver, or any other suitable communication device. Input device 416 can be a computer keyboard, a microphone, a mouse, a trackball, a keypad, a remote control, any other suitable input device, and/or any suitable combination thereof. Additionally or alternatively, input device 416 can include a touch screen display 414 that can receive input (e.g. using a finger, a stylus, or the like).

Server 302 can include a hardware processor 422, a display 424, an input device 426, and memory 428, which can be interconnected. In some implementations, memory 428 can include a storage device for storing data received through communications link 304 or through other links, and processor 422 can receive commands and values transmitted by one or more users of, for example, computing device 310. The storage device can further include a server program for controlling hardware processor 422.

The mechanisms described herein for generating search results based contextual information can be implemented in computing devices 310 and/or server 302 as software, firmware, hardware, and/or any suitable combination thereof.

In some implementations, server 302 can be implemented as one server or can be distributed as any suitable number of servers. For example, multiple servers 302 can be implemented in various locations to increase reliability, function of the mechanisms described herein, and/or the speed at which the server can communicate with computing devices 310.

Figure 5:
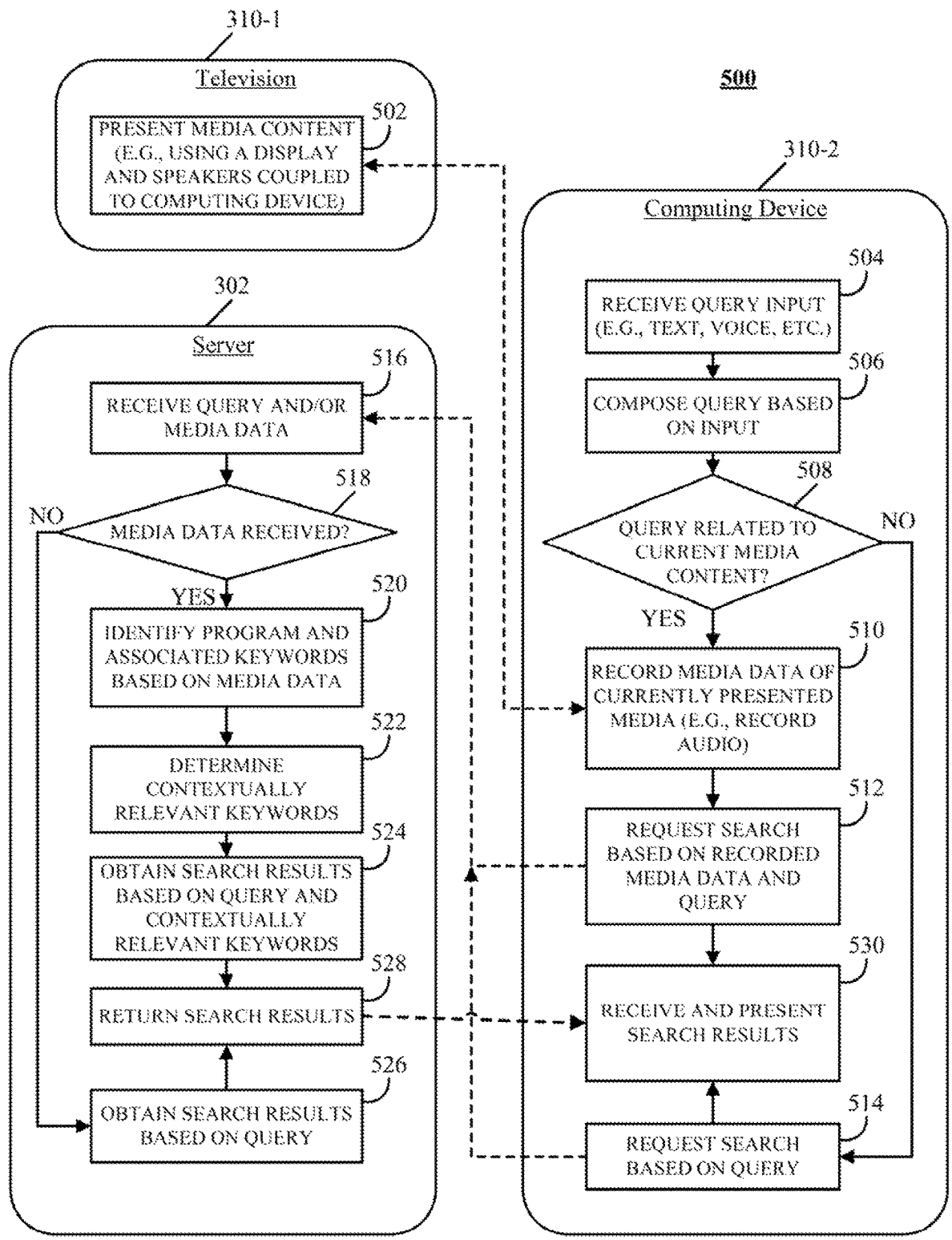
FIG. 5 shows an example of a flow for generating search results based on contextual information in accordance with some implementations of the disclosed subject matter.

FIG. 5 shows an example 500 of a flow for generating search results based on contextual information in accordance with some implementations of the disclosed subject matter. As shown in FIG. 5, a first computing device 310-1 can present media content, at 502. For example, first computing device 310-1 can be a television that includes a display for presenting video and speakers for presenting audio. Although flow 500 is described in connection with media being presented by a television, this is merely an example and media can be presented by any suitable device or devices.

At 504, a second computing device 310-2 can receive a query input. As described above, the query input can be received using any suitable technique or techniques. For example, the query can be received as text that is input using, e.g., a keyboard, which can be a physical keyboard or a virtual keyboard. As another example, the query can be received as voice data received via a microphone and interpreted using speech recognition techniques. Additionally or alternatively, the query input can be received using any suitable application. For example, as described in connection with FIG. 2, the query can be received in connection with a user interface for composing a query. As another example, the query can be received by second computing device 310-2 as a query to a personal assistant application or the like (e.g., an application that can handle various queries based on context and can initiate processes based on the query). In a more particular example, such a query can be initiated by a user speaking a particular word or phrase.

At 506, second computing device can compose a query based on the query input received at 504. For example, the query can be formatted, or otherwise prepared to be used in obtaining search results. At 508, second computing device 310-2 can determine whether the query is related to media that is currently being presented. Second computing device 310-2 can use any suitable technique to determine whether the query is related to media content that is currently being presented (e.g., by television 310-1), at 506. For example, as described above in connection with 102, the mechanisms described herein can determine that the query is related to media content that is currently being presented based on the context of the query, the application that received the query input, and/or based on any other suitable criteria. In some implementations, the determination of whether the query is related to media content that is currently being presented can be made by second computing device 310-2. For example, second computing device 310-2 can make the determination based on the application that is being used to compose the query, based on a user input indicating that the query is directed to media that is currently being presented, and/or on any other suitable basis. Additionally or alternatively, a device executing the mechanisms described herein, such as server 302, can make the determination of whether the query is related to media content that is currently being presented. For example, second computing device 310-2 can send the query to server 302, and server 302 can determine that the query is related to media that is currently being presented based on the context of the query, based on the application used to compose the query, and/or on any other suitable basis. Server 302 can then notify second computing device 310-2 that the query is related to media content that is currently being presented.

If the query is not related to media content that is currently being presented, ("NO" at 508), flow 500 can proceed to 514 where a search can be requested based on the query composed at 506. Otherwise, if the query is related to media content that is currently being presented, ("YES" at 508), flow 500 can proceed to 510.

At 510, in response to determining that the query is related to media that is currently being presented, second computing device 310-2 can record media data to be used in identifying the media that is currently being presented. As described above, the media data can be any suitable media data to be used in identifying the media that is currently being presented. As shown by a dashed line in FIG. 5, media data corresponding to media that is currently being presented by first computing device 310-1 can be conveyed to second computing device 310-2. Any suitable technique can be used to convey the media data to second computing device 310-2. For example, a microphone of second computing device 310-2 can be used to record audio data of the media content that is being presented. As another example, an image sensor of second computing device 310-2 can be used to record image data and/or video data of the media content htat is being presented. As yet another example, second computing device 310-2 can receive media data from computing device 310-1 using a wireless communication technique such as short range wireless communications (e.g., BLUETOOTH, wireless USB, etc.), a wireless communication technique that complies with one or more of the IEEE 802.11 group of wireless communication standards, and/or any other suitable wireless communication techniques. As yet another example, a signal or signals that include the media content that is currently being presented by first computing device 310-1 can also be provided to second computing device 310-2, which can record any suitable information from the signal. In a more particular example, a signal or signals that include the media content that is currently being presented by first computing device 310-1 can be output by first computing device 310-1 over a wired or wireless communications link to second computing device 310-2. Additionally or alternatively, a signal or signals that include the media content that is currently being presented by first computing device 310-1 can be input to second computing device 310-2 from a source of the media content currently being presented. In particular, if the media content is being presented by a television (e.g., first computing device 310-1) based on a signal output by a set-top box, that signal can also be routed to second computing device 310-2 (which can be, for example, a game console). The signal can be routed to second computing device 310-2 using any suitable path, for example by being input to first computing device 310-1 via second computing device 310-2, or by being passed to second computing device 310-2 via an audio and/or video output of first computing device 310-1.

At 512, second computing device 310-2 can request search results based on the query received at 504 and/or composed at 506 and the media data recorded at 510. For example, the request for search results can be submitted to server 302.

At 516, server 302 can receive the query and/or media data submitted by second computing device 310-2 at 512 and/or 514. In some implementations, actions performed at 516 can, for example, correspond to 102 and 104 of process 100 described above in connection with FIG. 1.

At 518, server 302 can determine whether media data related to media content that is currently being presented has been received. If media data has not been received ("NO" at 518), server 302 can proceed to 526 and can obtain search results based on the query received at 516. Otherwise, if media data has been received ("YES" at 518), server 302 can proceed to 520.

At 520, server 302 can identify a program corresponding to the media data received at 516 (e.g., as described above in connection with 106), and can identify keywords associated with the program and/or a particular portion of the program corresponding to the media data (e.g., as described above in connection with 108). At 522, server 302 can determine contextually relevant keywords from the identified keywords (e.g., as described above in connection with 522). At 524, server 302 can obtain search results based on the query and the contextually relevant keywords (e.g., as described above in connection with 112).

At 528, server 302 can return the search results obtained at 524 to second computing device 310-2 that were obtained at 524 or 526. In some implementations, if media data is received but a query is not received, server 302 can identify a program corresponding to the media data and return the results without obtaining search results based on the query.

At 530, second computing device 310-2 can receive the search results and can cause at least one of the search results to be presented. In some implementations, the results can be presented using a display of second computing device 310-2 (e.g., as described above in connection with FIG. 2, above). Additionally or alternatively, the results can be presented using a display of first computing device 310-1 with the media content that is currently being presented.

In some implementations, a single computing device can both be presenting the media content as well as composing the query and presenting the search results. For example, a personal computer, smart television, smartphone, tablet computer, etc., can present media content, compose queries related to the media content, transmit media data to server 302, and present search results obtained based on the media data and the query. As another example, a first application being executed by the computing device can cause the content to be presented, and a second application being executed by the computing device can receive and/or compose the query related to the media content that is currently being presented by the first application. The second application, can, for example, use audio data and/or image data that is currently being presented by the computing device to identify media that is currently being presented. Such audio data and/or image data can be captured using any suitable technique or combination of techniques, such as by receiving an audio output signal that is currently being generated by the computing device, by receiving audio data captured using a microphone associated with the computing device, by receiving image data that is currently being presented by the computing device (e.g., a screenshot), and/or any other suitable technique or combination of techniques.

In some implementations, the mechanisms described herein can include client-side software, server-side software, hardware, firmware, and/or any suitable combination thereof. For example, the mechanisms described herein can encompass a computer program that causes one or more processors to execute the mechanisms described herein. As another example, the mechanisms described herein can encompass a computer program written in a programming language recognizable by computing device 310 and/or server 302 being used to access and/or execute the mechanisms described herein (e.g., a program written in a programming language, such as, Java, C, Objective-C, C++, C#, Javascript, Visual Basic, HTML, XML, ColdFusion, any other suitable approaches, and/or any suitable combination thereof).

In some implementations, the mechanisms described herein can encompass one or more web pages or web page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, any other suitable approaches, and/or any suitable combination thereof).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 5 can be executed or performed in any order or sequence not limited to the order and sequence shown and described in the figures. Also, some of the above steps of the processes of FIGS. 1 and 5 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for generating search results based on contextual information are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting search results, the method comprising:
 receiving, using a hardware processor of a computing device, a query that includes a plurality of query terms, wherein the plurality of query terms includes a question term;
 determining, using the hardware processor, based on the plurality of query terms, whether the query is a time-sensitive query type that relates to a media content item that is currently being presented by a media playback device that is connected to the computing device over a communications network;
 in response to determining that the query is the time-sensitive query type that relates to the media content item that is currently being presented by the media playback device:
  capturing, using the hardware processor, media data corresponding to the media content item that is currently being presented by the media playback device;
  identifying, using the hardware processor, a media content segment of the media content item having a time period that corresponds to when the query was received by the computing device;
  determining, using the hardware processor, at least one keyword having an entity type that is responsive to the question term included in the query; and
  obtaining, using the hardware processor, at least one search result responsive to the query and the at least one keyword; and
 causing, using the hardware processor, the at least one search result to be presented to the user.

2. The method of claim 1, wherein the query is determined to be the time-sensitive query type based on contextual information associated with the query.

3. The method of claim 1, wherein the query is determined to be the time-sensitive query type based on an application executing on the computing device that received the query.

4. The method of claim 3, further comprising receiving the media content segment of the first media content item that is currently being presented based on a comparison of the first audio fingerprint to a plurality of audio fingerprints associated with the first media content item, wherein each of the plurality of audio fingerprints associated with the first media content item corresponds to a particular portion of the first media content item.

5. The method of claim 1, wherein the media data includes audio data and wherein the method further comprises:
 causing a first audio fingerprint of the received audio data to be compared to audio fingerprints corresponding to a plurality of media content items; and
 receiving an identity of a first media content item of the plurality of media content items to which the first audio fingerprint corresponds based on the comparison, wherein the media content item that is currently being presented is identified based on the received identity of the first media content item.

6. The method of claim 1, wherein the at least one keyword having the entity type that is responsive to the question term included in the query is determined using natural language processing.

7. The method of claim 1, wherein the keywords correspond to objects of interest that appear in the program.

8. The method of claim 1, wherein the at least one search result is presented to the user on a display device associated with the computing device.

9. The method of claim 1, wherein the at least one search result is presented to the user on a display device associated with the media playback device.

10. A system for presenting search results, the system comprising:
 a hardware processor of a computing device, wherein the hardware processor is programmed to:
  receive a query that includes a plurality of query terms, wherein the plurality of query terms includes a question term;
  determine, based on the plurality of query terms, whether the query is a time-sensitive query type that relates to a media content item that is currently being presented by a media playback device that is connected to the computing device over a communications network;
  in response to determining that the query is the time-sensitive query type that relates to the media content item that is currently being presented by the media playback device:
   capture media data corresponding to the media content item that is currently being presented by the media playback device;
   identify a media content segment of the media content item having a time period that corresponds to when the query was received by the computing device;
   determine at least one keyword having an entity type that is responsive to the question term included in the query; and
   obtain at least one search result responsive to the query and the at least one keyword; and
  cause the at least one search result to be presented to the user.

11. The system of claim 10, wherein the query is determined to be the time-sensitive query type based on contextual information associated with the query.

12. The system of claim 10, wherein the query is determined to be the time-sensitive query type based on an application executing on the computing device that received the query.

13. The system of claim 10, wherein the media data includes audio data and wherein the hardware processor further programmed to:
 cause a first audio fingerprint of the received audio data to be compared to audio fingerprints corresponding to a plurality of media content items; and
 receive an identity of a first media content item of the plurality of media content items to which the first audio fingerprint corresponds based on the comparison, wherein the media content item that is currently being presented is identified based on the received identity of the first media content item.

14. The system of claim 13, wherein the hardware processor is further programmed to receive the media content segment of the first media content item that is currently being presented based on a comparison of the first audio fingerprint to a plurality of audio fingerprints associated with the first media content item, wherein each of the plurality of audio fingerprints associated with the first media content item corresponds to a particular portion of the first media content item.

15. The system of claim 10, wherein the at least one keyword having the entity type that is responsive to the question term included in the query is determined using natural language processing.

16. The system of claim 10, wherein the keywords correspond to objects of interest that appear in the program.

17. The system of claim 10, wherein the at least one search result is presented to the user on a display device associated with the computing device.

18. The system of claim 10, wherein the at least one search result is presented to the user on a display device associated with the media playback device.

19. A non-transitory computer-readable medium containing computer executable instructions that, when executed by a processor of a computing device, cause the processor to perform a method for presenting search results, the method comprising:

receiving a query that includes a plurality of query terms, wherein the plurality of query terms includes a question term;

determining, based on the plurality of query terms, whether the query is a time-sensitive query type that relates to a media content item that is currently being presented by a media playback device that is connected to the computing device over a communications network;

in response to determining that the query is the time-sensitive query type that relates to the media content item that is currently being presented by the media playback device:

capturing media data corresponding to the media content item that is currently being presented by the media playback device;

identifying a media content segment of the media content item having a time period that corresponds to when the query was received by the computing device;

determining at least one keyword having an entity type that is responsive to the question term included in the query; and obtaining at least one search result responsive to the query and the at least one keyword; and causing the at least one search result to be presented to the user.

* * * * *